United States Patent
Kasahara et al.

(10) Patent No.: US 9,845,095 B2
(45) Date of Patent: Dec. 19, 2017

(54) VEHICLE CONTROL DEVICE AND VEHICLE CONTROL METHOD

(71) Applicant: JATCO Ltd, Fuji-shi, Shizuoka (JP)

(72) Inventors: Seiji Kasahara, Atsugi (JP); Hideshi Wakayama, Hadano (JP); Naohiro Hoshi, Atsugi (JP)

(73) Assignee: JATCO LTD, Fuji-Shi (JP)

( * ) Notice: Subject to any disclaimer, the term of this patent is extended or adjusted under 35 U.S.C. 154(b) by 41 days.

(21) Appl. No.: 14/906,871

(22) PCT Filed: Jul. 8, 2014

(86) PCT No.: PCT/JP2014/068233
§ 371 (c)(1),
(2) Date: Jan. 21, 2016

(87) PCT Pub. No.: WO2015/012104
PCT Pub. Date: Jan. 29, 2015

(65) Prior Publication Data
US 2016/0159359 A1    Jun. 9, 2016

(30) Foreign Application Priority Data
Jul. 23, 2013   (JP) .................................. 2013-152557

(51) Int. Cl.
| | |
|---|---|
| *B60W 10/02* | (2006.01) |
| *B60W 10/06* | (2006.01) |
| *B60W 30/18* | (2012.01) |
| *F16H 61/662* | (2006.01) |
| *F16H 61/48* | (2006.01) |
| *F16H 59/66* | (2006.01) |

(52) U.S. Cl.
CPC .... *B60W 30/18118* (2013.01); *B60W 10/023* (2013.01); *B60W 10/06* (2013.01); *F16H 61/48* (2013.01); *F16H 61/66259* (2013.01); *F16H 2059/663* (2013.01); *F16H 2312/022* (2013.01); *F16H 2312/04* (2013.01)

(58) Field of Classification Search
None
See application file for complete search history.

(56) References Cited

U.S. PATENT DOCUMENTS

| | | | |
|---|---|---|---|
| 7,134,538 B2 * | 11/2006 | Hasegawa | F16H 61/20 192/220.1 |
| 2002/0173391 A1 | 11/2002 | Endo et al. | |
| 2004/0231951 A1 * | 11/2004 | Hasegawa | B60T 7/12 192/220 |
| 2012/0035817 A1 * | 2/2012 | Waku | B60W 10/06 701/54 |

FOREIGN PATENT DOCUMENTS

| | | |
|---|---|---|
| EP | 1 154 175 A2 | 11/2001 |
| JP | 2002-340158 A | 11/2002 |
| JP | 2010-180850 A | 8/2010 |

* cited by examiner

*Primary Examiner* — Edwin A Young
(74) *Attorney, Agent, or Firm* — Foley & Lardner LLP

(57) ABSTRACT

A vehicle control device for controlling a vehicle with a drive source, a friction transmission mechanism provided between the drive source and drive wheels and a fluid transmission mechanism provided between the friction transmission mechanism and the drive source includes a suppression unit configured to suppress a decrease of a speed ratio of the fluid transmission mechanism if the speed ratio becomes negative when the vehicle starts.

12 Claims, 5 Drawing Sheets

VEHICLE CONTROL DEVICE AND VEHICLE CONTROL METHOD

TECHNICAL FIELD

The present invention relates to a vehicle control device and a vehicle control method.

BACKGROUND ART

If a vehicle is stopped on an uphill road by depressing a brake pedal and, thereafter, the brake pedal is no longer depressed (hereinafter, referred to as that a "brake is off"), the vehicle may slip down backward. If the vehicle slips down in a direction opposite to a starting direction, a direction of a torque transmitted from a drive source to a power transmission device such as a belt and a direction of a torque transmitted from drive wheels to the power transmission device become opposite to each other during slip-down and slippage or the like may occur in the power transmission device.

JP2002-340158A discloses a control device for suppressing the occurrence of slippage or the like in a power transmission device by increasing a hydraulic pressure supplied to the power transmission device in such a case.

SUMMARY OF INVENTION

However, only by increasing an instruction hydraulic pressure as in the above control device, the occurrence of slippage or the like in the power transmission device cannot be sufficiently suppressed when a vehicle slips down.

Specifically, an engine rotation speed when the brake is turned off and the vehicle slips down is close to an idle rotation speed and a relatively low rotation speed, and a discharge flow rate of an oil pump driven by an engine is also small. Thus, even if the instruction hydraulic pressure to the power transmission device is increased to suppress slippage or the like, an actual hydraulic pressure does not increase up to the instruction hydraulic pressure and it may not be possible to supply a hydraulic pressure necessary to suppress slippage or the like.

This is described. Such slippage or the like in the power transmission device can occur, for example, when the vehicle is stopped on an uphill road and a shift lever is selected to a forward travel range such as a D-range or when the vehicle is stopped on a downhill road and the shift lever is selected to an R-range. Further, the slippage or the like can occur when the vehicle is stopped on an uphill road with the shift lever in an N-range, the vehicle slips down by turning off the brake and the shift lever is changed to the D-range during slip-down and when the vehicle is stopped on a downhill road with the shift lever in the N-range, the vehicle slips down forward by turning off the brake and the shift lever is changed to the R-range during slip-down.

In such a case, in a torque converter disposed between the power transmission device and the drive source, the rotation directions of a rotation speed of an input shaft of the torque converter and the rotation speed of an output shaft of the torque converter are reversed when an engine rotation direction is defined to be a positive direction. If the rotation speed of the input shaft of the torque converter is constant near the idle rotation speed before an accelerator pedal is depressed, a speed ratio (=rotation speed of the output shaft/rotation speed of the input shaft) in the torque converter decreases toward a negative side (absolute value increases) as the rotation speed of the output shaft of the torque converter increases. When the speed ratio becomes smaller than a predetermined speed ratio having a negative value, the torque capacity coefficient of the torque converter (hereinafter, written as a "capacity coefficient") suddenly increases. As a result, a hydraulic pressure necessary to prevent the slippage of the power transmission device also increases. Thus, it was found out that, only by using the flow of the oil pump driven near the idle rotation speed, an actual hydraulic pressure did not increase up to an instruction hydraulic pressure and slippage occurred even if the hydraulic pressure necessary to prevent slippage was instructed as the instruction hydraulic pressure.

It should be noted that although the actual hydraulic pressure of the power transmission device reaches the instruction hydraulic pressure due to an increase of the engine rotation speed if the accelerator pedal is depressed, there is a time lag until the actual hydraulic pressure increases after the accelerator pedal is depressed. Thus, slippage or the like may occur in the power transmission device during this time lag.

Further, when the speed ratio of the torque converter becomes negative and the capacity coefficient increases, an engine stall may occur in the engine that is the drive source. If the engine stall occurs, the oil pump stops, the hydraulic pressure supplied to the power transmission device is reduced and slippage or the like may occur in the power transmission device.

The present invention was developed to solve such problems and aims to suppress an increase of a capacity coefficient of a torque converter and suppress the occurrence of slippage or the like in a power transmission device when a speed ratio of a fluid transmission mechanism such as the torque converter has a negative value.

A vehicle control device according to one aspect of the present invention is a vehicle control device for controlling a vehicle with a drive source, a friction transmission mechanism provided between the drive source and drive wheels, and a fluid transmission mechanism provided between the friction transmission mechanism and the drive source, and includes a suppression unit for suppressing a decrease of a speed ratio of the fluid transmission mechanism if the speed ratio becomes negative when the vehicle starts.

A vehicle control method according to another aspect of the present invention is a vehicle control method for controlling a vehicle with a drive source, a friction transmission mechanism provided between the drive source and drive wheels and a fluid transmission mechanism provided between the friction transmission mechanism and the drive source, wherein a decrease of a speed ratio of the fluid transmission mechanism is suppressed if the speed ratio becomes negative when the vehicle starts.

According to these aspects, an increase of a capacity coefficient of the fluid transmission mechanism can be suppressed by suppressing a decrease of the speed ratio of the fluid transmission mechanism by the suppression unit if the speed ratio of the fluid transmission mechanism becomes negative when the vehicle starts. As a result, an increase of a capacity necessary in the friction transmission mechanism can be suppressed, wherefore the occurrence of slippage or the like of the friction transmission mechanism can be suppressed even under an operation condition where the vehicle starts.

DESCRIPTION OF EMBODIMENT

Hereinafter, an embodiment of the present invention is described with reference to the accompanying drawings. It should be noted that, in the following description, a "transmission ratio" of a certain transmission mechanism is a value obtained by dividing an input rotation speed of this transmission mechanism by an output rotation speed thereof.

Figure 1:
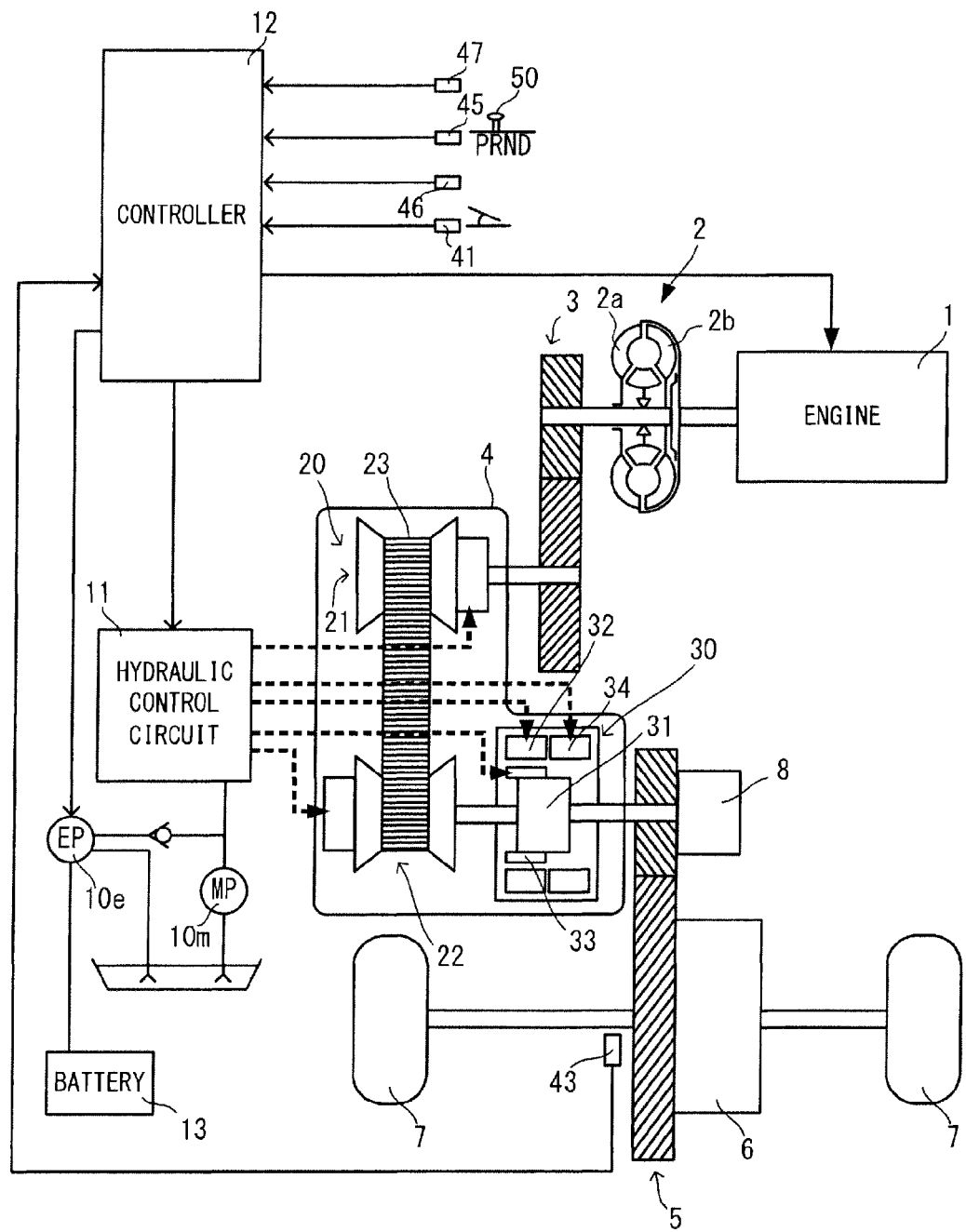
FIG. 1 is a schematic configuration diagram of a vehicle of an embodiment.

FIG. 1 is a schematic configuration diagram of a vehicle according to the embodiment of the present invention. This vehicle includes an engine 1 as a drive source, and output rotation of the engine 1 is input to a pump impeller 2a (input shaft) of a torque converter 2 (fluid transmission mechanism) with a lock-up clutch and transmitted from a turbine runner 2b (output shaft) to drive wheels 7 via a first gear train 3, a continuously variable transmission (hereinafter, merely referred to as a "transmission 4"), a second gear train 5 and a differential device 6. The second gear train 5 includes a parking mechanism 8 for mechanically and unrotatably locking an output shaft of the transmission 4 in a parked state.

The transmission 4 is provided with a mechanical oil pump 10m to which the rotation of the engine 1 is input and which is driven by using part of power of the engine 1 and an electrical oil pump 10e which is driven upon receiving the supply of power from a battery 13. Further, the transmission 4 is provided with a hydraulic control circuit 11 for adjusting a hydraulic pressure from the mechanical oil pump 10m or the electrical oil pump 10e and supplying the adjusted hydraulic pressure to each part of the transmission 4.

The transmission 4 includes a V-belt continuously variable transmission mechanism (hereinafter, referred to as a "variator 20") as a friction transmission mechanism and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to the preceding stage (input shaft side) of the variator 20.

The variator 20 includes a primary pulley 21, a secondary pulley 22 and a V-belt 23 mounted between the pulleys 21 and 22. When hydraulic pressures supplied to the primary pulley 21 and the secondary pulley 22 are adjusted, the widths of V-grooves change to change a contact radius of the V-belt 23 and each pulley 21, 22, whereby a transmission ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. By adjusting hydraulic pressures supplied to the frictional engagement elements 32 to 34 to change engaged/released states of the frictional engagement elements 32 to 34, a gear position of the sub-transmission mechanism 30 is changed.

Each frictional engagement element is provided in the preceding or succeeding stage of the variator 20 on the power transmission path and power transmission of the transmission 4 is enabled if any one of these is engaged while being disabled if all frictional engagement elements are released.

Figure 2:
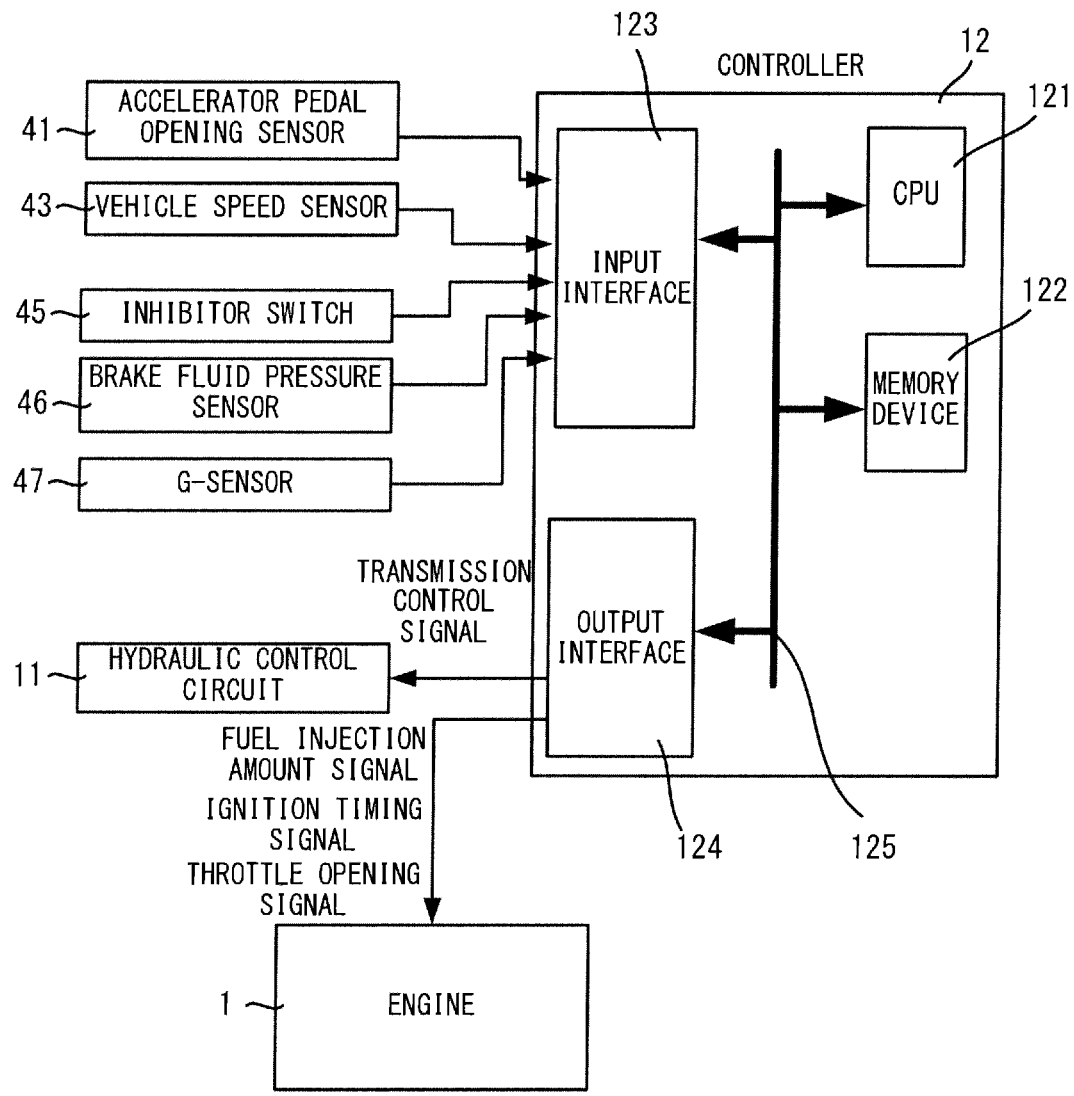
FIG. 2 is a schematic configuration diagram of a controller.

A controller 12 is a controller for integrally controlling the engine 1 and the transmission 4 and, as shown in FIG. 2, configured by a CPU 121, a memory device 122 composed of a RAM and a ROM, an input interface 123, an output interface 124 and a bus 125 which connects these components to each other.

To the input interface 123 are input an output signal of an accelerator pedal opening sensor 41 for detecting an accelerator pedal opening indicating an operated amount of an accelerator pedal, an output signal of a vehicle speed sensor 43 for detecting a vehicle speed, an output signal of an inhibitor switch 45 for detecting the position of a select lever 50, an output signal of a brake fluid pressure sensor 46 for detecting the brake fluid pressure of a wheel, an output signal of a G-sensor 47 capable of detecting the inclination of a vehicle body (road surface gradient) and the like.

A control program of the engine 1, a transmission control program of the transmission 4, and various maps and tables used in these programs are stored in the memory device 122. The CPU 121 reads and executes the programs stored in the memory device 122, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and a motor driver of the electrical oil pump 10e via the output interface 124. Various values used in the computations by the CPU 121 and computation results thereof are appropriately stored in the memory device 122.

The hydraulic control circuit 11 is composed of a plurality of flow passages and a plurality of hydraulic control valves. In accordance with a transmission control signal from the controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e and supplies this to each part of the transmission 4. In this way, the transmission ratio of the variator 20 and the gear position of the sub-transmission mechanism 30 are changed and the speed of the transmission 4 is changed.

Next, belt slippage in the variator 20 when the vehicle slips down is described. It should be noted that, in the present embodiment, a rotation direction when the engine 1 is driven is defined as a positive rotation direction and an opposite direction is defined as a negative rotation direction. If a brake is turned off when the vehicle is stopped on an inclined road surface (uphill road, downhill road), the vehicle may slip down. Particularly, when the select lever 50 is in an N-range, a drive force is not transmitted from the engine 1 to the drive wheels 7 and the vehicle easily slips down. For example, when the vehicle slips down after being stopped on an uphill road and the select lever 50 is changed from the N-range to a D-range to start the vehicle during slip-down, a vehicle starting direction (traveling direction on the basis of the select lever 50) and a slip-down direction of the vehicle become opposite to each other. If the select lever D is changed to the D-range and the low brake 32 of the sub-transmission mechanism 30 is engaged, a torque is transmitted from the drive wheels 7 to the turbine runner 2b of the torque converter 2 and a rotation speed of the turbine runner 2b gradually decreases. If the vehicle further slips down, the turbine runner 2b is rotated in an opposite direction by the torque transmitted from the drive wheels 7 and a rotation direction of the pump impeller 2a of the torque converter 2 and that of the turbine runner 2b become opposite to each other and a speed ratio becomes negative. It should be noted that the same holds true also in the case where the brake is turned off, the vehicle slips down and the select lever 50 is changed from the N-range to an R-range after the vehicle is stopped on a downhill road.

Figure 3:
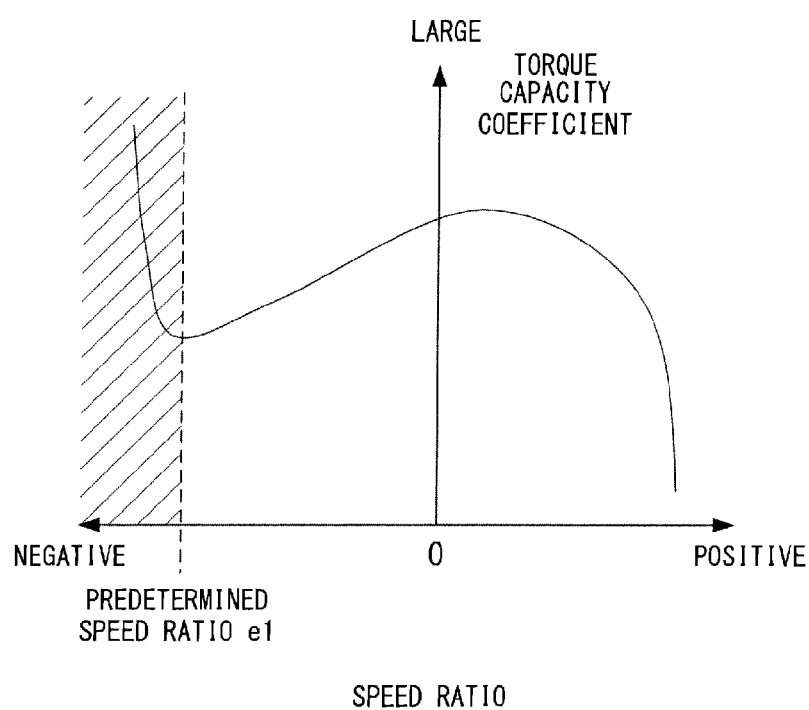
FIG. 3 is a graph showing a relationship of a speed ratio and a capacity coefficient.

A relationship of the speed ratio and a capacity coefficient in the torque converter 2 was found to be generally such that the capacity coefficient suddenly increased with a decrease of the speed ratio when the speed ratio became smaller than a predetermined speed ratio e1 which was a negative value (when an absolute value increased in a negative region) as shown in FIG. 3.

When the speed ratio becomes negative and the capacity coefficient increases, a torque obstructing the rotation of the rotation of the turbine runner 2b, i.e. the primary pulley 21 increases. On the other hand, the torque is transmitted to the secondary pulley 22 from the drive wheels 7. As just described, when torques acting in opposite directions are input to the primary pulley 21 and the secondary pulley 22 and an absolute value of a torque difference increases, the hydraulic pressure necessary to suppress belt slippage increases. Thus, under an operation condition in which the rotation speed of the engine 1 is near an idle rotation speed, a flow rate of the mechanical oil pump 10m is low and belt slippage may occur in the variator 20.

Accordingly, in the present embodiment, a start control described below is executed to suppress belt slippage in the variator 20 even if the speed ratio becomes negative.

Figure 4:
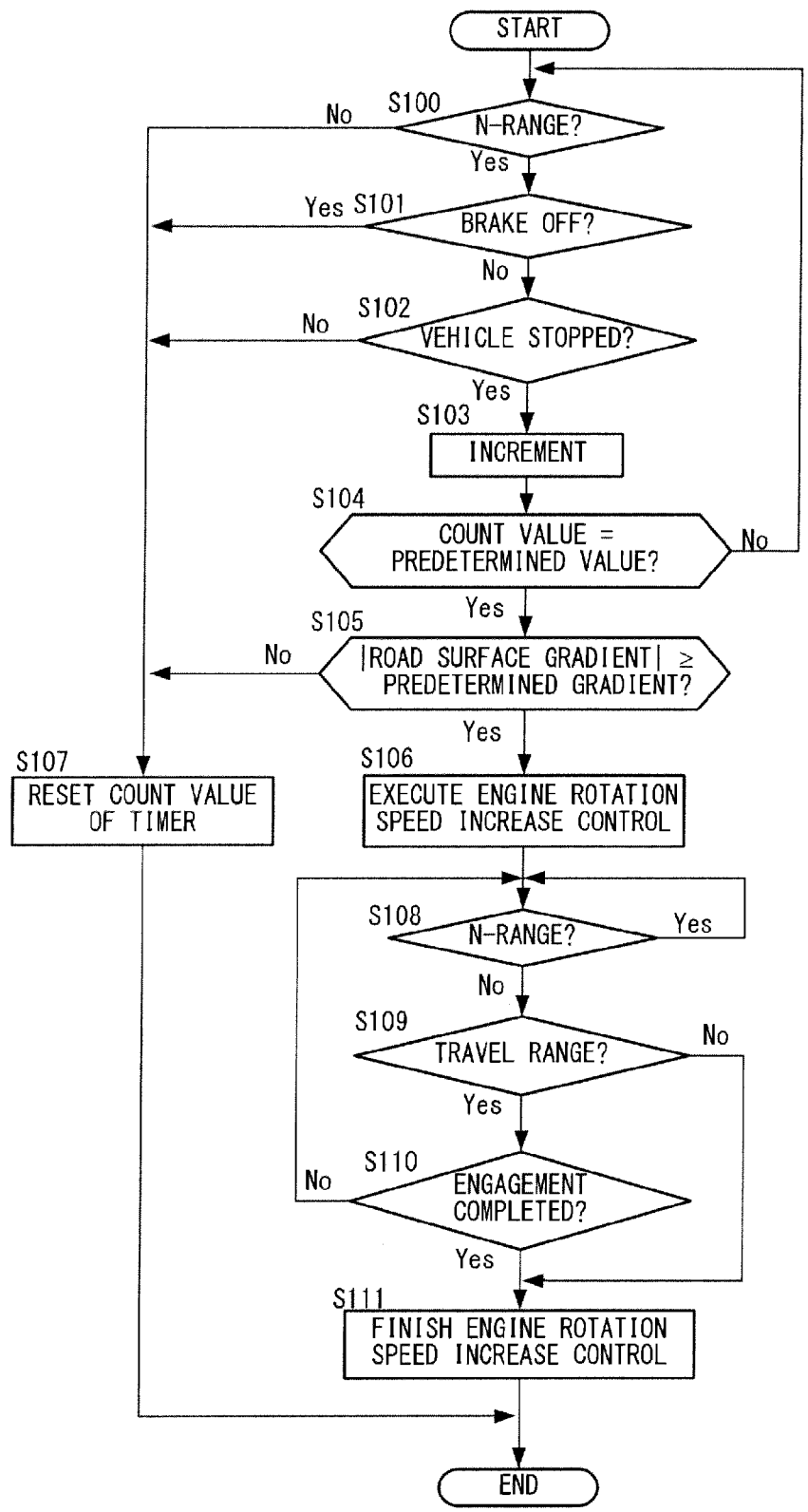
FIG. 4 is a flow chart showing a start control of the embodiment.

Next, the start control of the present embodiment is described using a flow chart of FIG. 4.

In Step S100, the controller 12 determines on the basis of an output signal of the inhibitor switch 45 whether or not the select lever 50 is in the N-range. A process proceeds to Step S101 if the select lever 50 is in the N-range while proceeding to Step S107 unless the select lever 50 is in the N-range. It should be noted that each frictional engagement element of the sub-transmission mechanism 30 is released if the select lever 50 is in the N-range.

In Step S101, the controller 12 determines whether or not the brake is off. Specifically, the controller 12 determines on the basis of an output signal of the brake fluid pressure sensor 46 whether or not a depressed amount of a brake pedal is smaller than a predetermined amount. This predetermined amount is a depressed amount at which a braking force is applied to the vehicle due to the depression of the brake pedal, in other words, an amount capable of determining whether or not a braking force is applied to the vehicle. The process proceeds to Step S102 unless the brake is off while proceeding to Step S107 if the brake is off.

In Step S102, the controller 12 determines whether or not the vehicle is stopped. Specifically, the controller 12 determines on the basis of an output signal of the vehicle speed sensor 43 whether or not the vehicles speed is not higher than a first predetermined vehicle speed capable of judging that the vehicle is stopped. The process proceeds to Step S103 if the vehicle is determined to be stopped while proceeding to Step S107 unless the vehicle is determined to be stopped.

In Step S103, the controller 12 increments a count value of a timer. It should be noted that counting by the timer is started if counting by the timer has not been started yet. The controller 12 measures the time elapsed after the stop of the vehicle by the timer.

In Step S104, the controller 12 determines whether or not the count value of the timer has reached a predetermined value. This predetermined value is set as the time elapsed until an output signal from the G-sensor 47 is stabilized after the vehicle is stopped. When the count value of the timer reaches the predetermined value, the signal from the G-sensor 47 is stabilized and a gradient of a road surface on which the vehicle is stopped can be accurately detected by the G-sensor 47. The process returns to Step S100 until the count value of the timer reaches the predetermined value while proceeding to Step S105 if the count value of the timer reaches the predetermined value.

In Step S105, the controller 12 determines whether or not an absolute value of the output signal from the G-sensor 47 is not smaller than a predetermined value. Specifically, it is determined whether or not an absolute value of the road surface on which the vehicle is stopped is not smaller than a predetermined gradient. The predetermined gradient is a gradient at which the vehicle moves by its own weight when the brake is off. The controller 12 determines whether or not the absolute value of the gradient of the road surface is not smaller than the predetermined value regardless of whether the vehicle is stopped on an uphill road or on a downhill road. The process proceeds to Step S106 if the absolute value of the gradient of the road surface is not smaller than the predetermined value while proceeding to Step S107 if the absolute value of the gradient of the road surface is smaller than the predetermined value.

In Step S106, the controller 12 executes an engine rotation speed increase control by setting a lower limit value of the engine rotation speed higher than a normal idling rotation speed (when the absolute value of the gradient of the road surface is smaller than the predetermined gradient). Specifically, the lower limit value of the engine rotation speed (rotation speed of the pump impeller 2a) is set to a predetermined rotation speed N1 so that the speed ratio of the torque converter 2 becomes the predetermined speed ratio e1 for a second predetermined vehicle speed (rotation speed of the turbine runner 2b) reached when the brake is turned off and the vehicle slips down. In this way, a speed ratio that falls below the predetermined speed ratio e1 can be suppressed even when the vehicle slips down and the vehicle speed at that time becomes the second predetermined vehicle speed. Thus, the entry of the capacity coefficient into a region shown by hatching in FIG. 3 can be suppressed. The second predetermined vehicle speed is a vehicle speed set in advance and the maximum vehicle speed reached during a time supposed to elapse until a driver depresses the brake pedal or until the engagement of the frictional engagement element is completed when the vehicle slips down, for example, in starting at the above predetermined gradient.

It should be noted that the capacity coefficient in a region at or below the predetermined speed ratio e1 may be lower than the capacity coefficient when the speed ratio is larger than the predetermined speed ratio e1, but the capacity coefficient suddenly increases with a decrease of the speed ratio in this region, wherefore aimed suppression may not be possible to achieve due to a response delay or the like in controlling the engine rotation speed. To prevent this, in the present embodiment, the entry of the speed ratio into this region where the capacity coefficient increases is suppressed in advance by setting the lower limit value of the engine rotation speed to the predetermined rotation speed N1 so that the speed ratio does not become smaller than the predetermined speed ratio e1.

Further, an increase of the capacity coefficient during slip-down is suppressed by setting the lower limit value of the engine rotation speed to the predetermined rotation speed N1 regardless of a starting direction of the vehicle. This is because it is not clear whether the vehicle moves forward or backward at the current point of time when the N-range is selected. Thereafter, when the vehicle actually slips down and the slip-down direction of the vehicle at that time and the starting direction of the vehicle selected by the select lever 50 become opposite to each other, belt slippage occurs in the variator 20. To suppress this, the lower limit value of the engine rotation speed is set to the predetermined rotation speed N1 to be higher than the normal idle rotation speed in advance when the brake is on in the N-range.

Furthermore, in the engine rotation speed increase control, the lower limit value of the engine rotation speed is set to the predetermined rotation speed N1 and an upper limit value is not set. Thus, if the accelerator pedal is depressed and the engine rotation speed corresponding to the depression of the accelerator pedal is higher than the predetermined rotation speed N1, the engine rotation speed is an engine rotation speed corresponding to the depression of the accelerator pedal. In this case, the speed ratio becomes larger than the predetermined vehicle speed e1, thereby making it possible to suppress entry into the region where the capacity coefficient suddenly increases and satisfy the driver's intention to accelerate.

In Step S107, the controller 12 resets the count value of the timer.

In Step S108, the controller 12 determines on the basis of an output signal from the inhibitor switch 45 whether or not the select lever 50 is in the N-range. The process proceeds to Step S109 unless the select lever 50 is in the N-range. If the select lever 50 is in the N-range, this process is repeated until the select lever 50 is changed to the range other than the N-range.

In Step S109, the controller 12 determines on the basis of the signal output from the inhibitor switch 45 whether or not the select lever 50 is in the travel range such as the D-range or the R-range. The process proceeds to Step S110 if the select lever 50 is in the travel range. Since it is determined in Step S108 that the select lever 50 is not in the N-range, if the select lever 50 is not in the travel range, the select lever 50 is in the P-range, the parking mechanism 8 is activated, the output shaft of the transmission 4 is mechanically locked and the vehicle does not slip down if the select lever 50 is not in the travel range. Thus, the process proceeds to Step S111.

In Step S110, the controller 12 determines whether or not the engagement of the frictional engagement element has been completed in the sub-transmission mechanism 30. Specifically, the controller 12 determines whether or not the low brake 32 has been engaged when the select lever 50 is in the D-range and determines whether or not the reverse brake 34 has been engaged when the select lever 50 is in the R-range. The process proceeds to Step S111 if the engagement has been completed, whereas a return is made to Step S108 to repeat the above process unless the engagement has been completed. It should be noted that determination on the completion of the engagement is made on the basis of whether or not the differential rotation of the frictional engagement element has disappeared.

In Step S111, the controller 12 finishes the engine rotation speed increase control.

Figure 5:
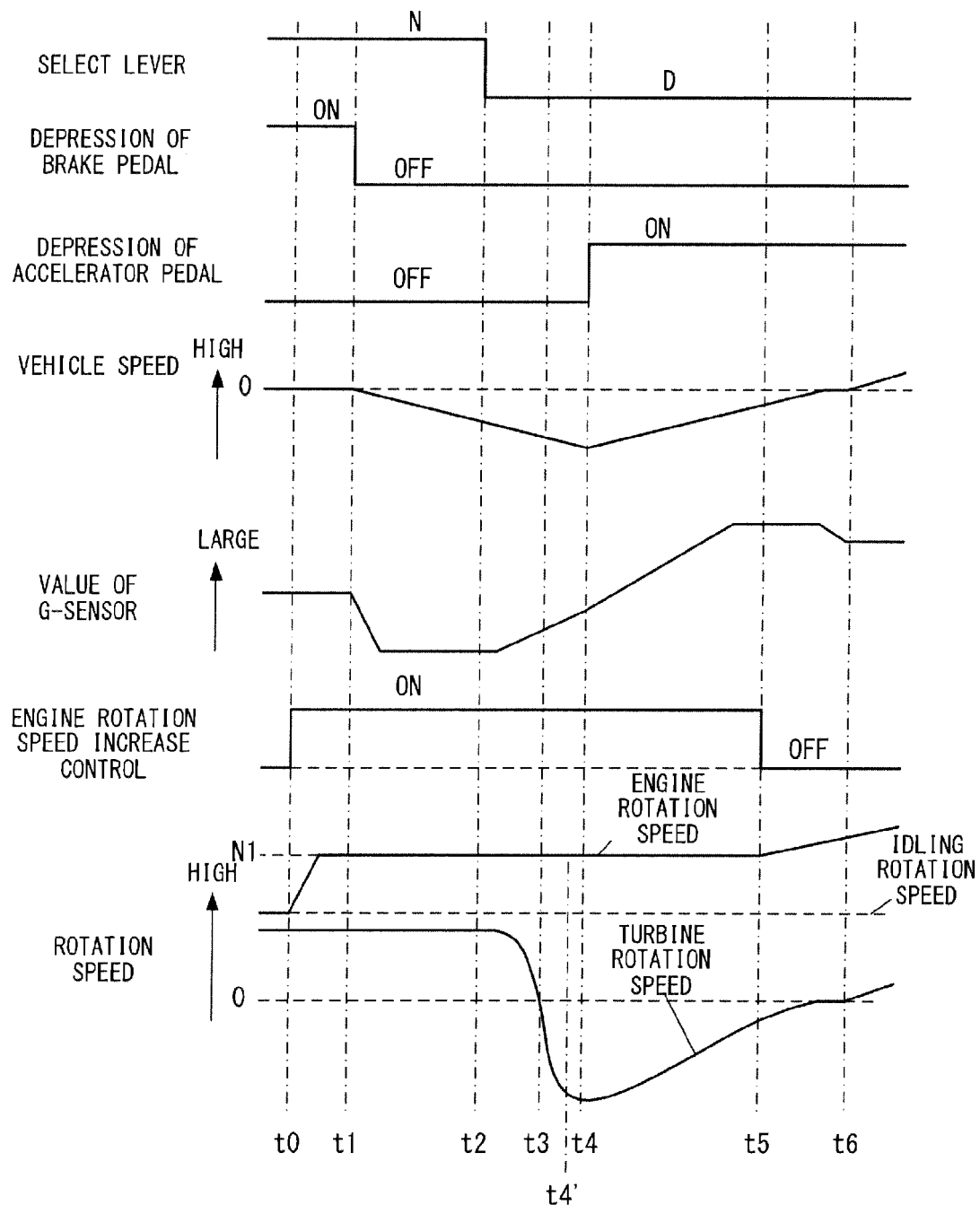
FIG. 5 is a time chart showing the start control of the embodiment.

Next, the start control of the present embodiment is described using a time chart of FIG. 5. It should be noted that a case where the brake is turned off, the vehicle slips down backward thereof from a state where the select lever 50 is selected to the N-range and the vehicle is stopped on an uphill road having a predetermined gradient or larger and, accordingly, the D-range is selected to move the vehicle forward is described as an example here.

When the vehicle stops and the count value of the timer reaches the predetermined value at time t0, the engine rotation speed increase control starts since the N-range is set and the gradient is not smaller than the predetermined gradient. This causes the engine rotation speed to be higher than the normal idle rotation speed. It should be noted that the turbine runner 2b is rotated in the same direction as the pump impeller 2a by a torque transmitted from the engine 1 since the transmission 4 is in a neutral state.

At time t1, the brake pedal is released. Then, the vehicle slips down backward thereof along a road surface by its own weight and a value of the G-sensor 47 becomes smaller. It should be noted that the turbine runner 2b is rotated in the same direction as the pump impeller 2a by a torque transmitted from the engine 1 since the transmission 4 is in the neutral state and this state does not change.

When the select lever 50 is changed to the D-range at time t2, the engagement of the low brake 32 of the sub-transmission mechanism 30 is started. In this way, a torque is transmitted to the turbine runner 2b from the drive wheels 7 to reduce the rotation speed of the turbine runner 2b.

At time t3, the rotation speed of the turbine runner 2b continuing to decrease until it becomes zero, the turbine runner 2b starts rotating in the opposite direction with respect to the rotation of the pump impeller 2a by the torque transmitted from the drive wheels 7 and the rotation direction of the turbine runner 2b becomes negative.

When the accelerator pedal is depressed at time t4, the torque transmitted from the engine 1 to the drive wheels 7 increases and the slip-down of the vehicle is reduced. Further, the rotation speed of the turbine runner 2b starts changing in an opposite direction and gradually increases in a positive direction.

It should be noted that if the engine rotation speed is kept at the idling rotation speed without using the present embodiment, the speed ratio becomes the predetermined speed ratio e1, for example, at time t4'. However, since the engine rotation speed is set higher than the normal idling rotation speed in the present embodiment, the speed ratio does not exceed the predetermined speed ratio e1. That is, since the engine rotation speed is set to the predetermined rotation speed N1 in advance, the capacity coefficient becomes smaller and an absolute value of a torque difference becomes smaller. Thus, a necessary hydraulic pressure capable of suppressing slippage is reduced. Accordingly, the actual hydraulic pressure can follow the instruction hydraulic pressure in a relatively short time, the flow rate of the mechanical oil pump 10m is also higher than during normal idling, the instruction hydraulic pressure can be achieved in a short time and belt slippage can be further suppressed.

When the engagement of the low brake 32 is completed at time t5, the engine rotation speed increase control is finished. It should be noted that the accelerator pedal is further depressed at time t5 to have a larger accelerator pedal opening than that from time t4 to time 5. Since the accelerator pedal opening at and after time t5 is an accelerator pedal opening at which the engine rotation speed is higher than N1, the engine rotation speed is higher than N1 at and after time t5.

At time t6, the rotation of the turbine runner 2b becomes positive, the vehicle speed becomes larger than zero and the vehicle moves forward on the uphill road.

Effects of the embodiment of the present invention are described.

If the speed ratio of the torque converter 2 becomes negative in starting the vehicle, a decrease of the speed ratio is suppressed so that the capacity coefficient of the torque converter 2 does not increase. This can suppress an increase of the capacity coefficient, eliminate a situation where the actual hydraulic pressure falls short of the instruction hydraulic pressure even in an operation region where the engine rotation speed in starting the vehicle is low, and suppress the occurrence of belt slippage in the variator 20.

If belt slippage occurs in the variator 20, the pulleys 21, 22 and the V-belt 23 are degraded. Thus, it is very important to suppress belt slippage in the variator 20. In the present embodiment, it is possible to suppress a decrease of the speed ratio, the occurrence of belt slippage and the degradation of the variator 20 when the speed ratio becomes negative.

Since the lower limit value of the engine rotation speed is set to the predetermined rotation speed N1 higher than the idling rotation speed when the speed ratio is negative, the speed ratio can be reliably increased and the occurrence of belt slippage in the variator 20 can be suppressed.

By setting the lower limit value of the engine rotation speed to the predetermined rotation speed N1 at which the speed ratio becomes the predetermined speed ratio e1, it is possible to suppress entry into the region where the capacity coefficient increases, an increase of the engine rotation speed and the deterioration of fuel economy in the engine 1.

The engine rotation speed increase control is executed when there is a possibility that the vehicle slips down, e.g. when an absolute value of a gradient of a road surface on which the vehicle is stopped is not smaller than the predetermined gradient. In this way, the engine rotation speed is increased in advance before the vehicle slips down and, even if the vehicle slips down thereafter and the speed ratio becomes negative, entry into the region where the capacity coefficient increases can be further suitably suppressed and the occurrence of belt slippage in the variator 20 can be suppressed. Further, the deterioration of fuel economy can be suppressed since the engine rotation speed increase control is executed only under a specific operation condition.

The vehicle slips down if the brake is turned off when an absolute value of a gradient of a road surface on which the vehicle is stopped is not smaller than the predetermined gradient and the select lever 50 is in the N-range. In this case, since no creep force is generated, an increase of the vehicle speed in the slip-down direction of the vehicle is faster and a time until the speed ratio becomes smaller than then predetermined speed ratio e1 is shorter than in the case where the select lever 50 is in the travel range. Accordingly, entry is easily made into the region where the capacity coefficient increases and belt slippage easily occurs in the variator 20. In the present embodiment, by increasing the engine rotation speed in advance before the vehicle slips down, entry into the region where the capacity coefficient increases can be suitably suppressed and the occurrence of belt slippage in the variator 20 can be reliably suppressed. Further, since a torque change caused by a change of the engine rotation speed is not transmitted to the drive wheels 7 even if the engine rotation speed is increased when the select lever 50 is in the N-range, the occurrence of a shock or the like caused by the change of the engine rotation speed can be suppressed.

Although the embodiment of the present invention has been described above, the above embodiment is merely one application example of the present invention and not of the nature to limit the technical scope of the prevent invention to the specific configuration of the above embodiment.

Although an example using the variator 20 as the friction transmission mechanism is described in the above embodiment, the friction transmission mechanism may be a stepped transmission or the like. By using the start control of the present embodiment, the abrasion and the like of frictional engagement elements of the stepped transmission can be suppressed and the durability of the stepped transmission can be improved.

Although the start of the vehicle when the select lever 50 is in the N-range has been described in the above embodiment, the start control of the above embodiment may be executed, for example, when the brake is turned off and the vehicle slips down in a state where the vehicle is stopped on an uphill road and the select lever 50 is in the D-range. Belt slippage in the variator 20 can be suppressed also by this.

Although the engine rotation speed increase control is executed before the vehicle actually slips down in the above embodiment, the engine rotation speed increase control may be executed after it is detected that the vehicle will slip down in a direction opposite to the traveling direction. This can shorten the time during which the engine rotation speed is high and further suppress the deterioration of fuel economy of the engine 1.

When the engine rotation speed increase control is executed in the start control of the present embodiment, a discharge flow rate of the mechanical oil pump 10m increases. Thus, the instruction hydraulic pressure of the variator 20 may be increased in advance to increase a belt sandwiching pressure. This can further suppress the occurrence of belt slippage in the variator 20.

Although the lower limit value of the engine rotation speed is set to the predetermined rotation speed N1 at which the speed ratio becomes the predetermined speed ratio e1 in the engine rotation speed increase control in the above embodiment, the lower limit value of the engine rotation speed may be set higher than the predetermined rotation speed N1. This can suppress entry into the region where the capacity coefficient increases and suppress belt slippage in the variator 20.

In the engine rotation speed increase control, the lower limit value of the engine rotation speed may be increased with an increase of the vehicle speed (an increase of the rotation speed of the turbine runner 2b). For example, the lower limit value of the engine rotation speed may be set according to the rotation speed of the turbine runner 2b that is the speed ratio becomes the predetermined speed ratio e1 or becomes larger than the predetermined speed ratio e1. This can reliably suppress entry into the region where the capacity coefficient increases, suppress an increase of the engine rotation speed in the operation region where the vehicle speed is low and further suppress the deterioration of fuel economy of the engine 1.

Although the engine rotation speed increase control is executed in the start control in the above embodiment, the variator 20 may be shift toward a high side. Thereby, the speed ratio is suppressed to be smaller than the predetermined speed ratio e1 and the occurrence of belt slippage in the variator 20 is suppressed.

The start control of the above embodiment may be used for hybrid vehicles.

The present application claims for priority based on Japanese Patent Application No. 2013-152557 filed with Japan Patent Office on Jul. 23, 2013, and the entire contents of this application are incorporated in this Description by reference.

The invention claimed is:

1. A vehicle control device for controlling a vehicle with a drive source, a friction transmission mechanism provided between the drive source and drive wheels and a fluid transmission mechanism provided between the friction transmission mechanism and the drive source, comprising:
a controller configured to suppress a decrease of a speed ratio of the fluid transmission mechanism before a rotation direction of an input shaft of the fluid transmission mechanism and a rotation direction of an output shaft thereof become opposite to each other if the speed ratio becomes negative when the vehicle starts.

2. The vehicle control device according to claim 1, wherein:
the drive source is an engine; and
the controller is configured to set a lower limit value of a rotation speed of the engine higher than an idling rotation speed.

3. The vehicle control device according to claim 2, wherein:
the controller is configured to set the lower limit value of the rotation speed of the engine higher than a rotation speed at which the speed ratio becomes a predetermined speed ratio.

4. The vehicle control device according to claim 2, wherein:
the controller is configured to set the lower limit value of the rotation speed of the engine to a rotation speed at which the speed ratio becomes a predetermined speed ratio.

5. The vehicle control device according to claim 2, wherein:
the controller is configured to increase the lower limit value of the rotation speed of the engine with an increase of a rotation speed of the output shaft.

6. The vehicle control device according to claim 1, wherein:
the controller is configured to
determine whether or not there is a possibility that a rotation direction of the input shaft and a rotation direction of the output shaft become opposite to each other when the vehicle is started; and
suppress a decrease of the speed ratio when the possibility that the rotation direction of the input shaft and the rotation direction of the output shaft become opposite to each other is determined.

7. The vehicle control device according to claim 6, wherein:
the controller is configured to determine the possibility that the rotation direction of the input shaft and the rotation direction of the output shaft become opposite to each other when an absolute value of a gradient of a road surface on which the vehicle is stopped is not smaller than a predetermined gradient.

8. The vehicle control device according to claim 7, wherein:
the controller is configured to determine the possibility that the rotation direction of the input shaft and the rotation direction of the output shaft become opposite to each other when the vehicle is in a neutral state where power is not transmitted from the drive source to the drive wheels.

9. The vehicle control device according to claim 6, wherein:
the controller is configured to determine the possibility that the rotation direction of the input shaft and the rotation direction of the output shaft become opposite to each other when the vehicle is in a neutral state where power is not transmitted from the drive source to the drive wheels.

10. The vehicle control device according to claim 1, wherein:
the friction transmission mechanism is a variator.

11. A vehicle control method for controlling a vehicle with a drive source, a friction transmission mechanism provided between the drive source and drive wheels and a fluid transmission mechanism provided between the friction transmission mechanism and the drive source, comprising:
suppressing a decrease of a speed ratio of the fluid transmission mechanism before a rotation direction of an input shaft of the fluid transmission mechanism and a rotation direction of an output shaft thereof become opposite to each other if the speed ratio becomes negative when the vehicle starts.

12. A vehicle control device for controlling a vehicle with a drive source, a friction transmission mechanism provided between the drive source and drive wheels and a fluid transmission mechanism provided between the friction transmission mechanism and the drive source, comprising:
determining means for determining whether a rotation direction of an input shaft of the fluid transmission mechanism and a rotation direction of an output shaft thereof become opposite to each other, and
suppression means for suppressing a decrease of a speed ratio of the fluid transmission mechanism before the rotation direction of the input shaft and the rotation direction of the output shaft become opposite to each other if the speed ratio becomes negative when the vehicle starts.

* * * * *